US012665397B2

(12) United States Patent
Buzzard et al.

(10) Patent No.: US 12,665,397 B2
(45) Date of Patent: Jun. 23, 2026

(54) DRONE DEPLOYABLE CLAMP WITH MODULAR PAYLOAD

(71) Applicant: Pitch Aeronautics Inc., Boise, ID (US)

(72) Inventors: Julianna Buzzard, Meridian, ID (US);
Adam Newell, Boise, ID (US);
Zachary H. Adams, Boise, ID (US);
Zachary D. Adams, Boise, ID (US);
Dannya Andrade Rosales, Mukilteo,
WA (US); Jeremy Abell, Boise, ID
(US); Jacob Tenorio, Boise, ID (US);
Dylan J. Schramm, Boise, ID (US);
Gavin Hamilton, Meridian, ID (US);
Saul Vasquez, Eagle, ID (US)

(73) Assignee: Pitch Aeronautics Inc., Boise, ID (US)

( * ) Notice: Subject to any disclaimer, the term of this
patent is extended or adjusted under 35
U.S.C. 154(b) by 449 days.

(21) Appl. No.: 18/524,225

(22) Filed: Nov. 30, 2023

(65) Prior Publication Data

US 2025/0180095 A1      Jun. 5, 2025

(51) Int. Cl.
H02G 1/02          (2006.01)
B64U 20/00         (2023.01)
B64U 101/00        (2023.01)

(52) U.S. Cl.
CPC ............... H02G 1/02 (2013.01); B64U 20/00
(2023.01); B64U 2101/00 (2023.01)

(58) Field of Classification Search
CPC ............... H02G 1/02; H02G 1/04; H02G 7/00
See application file for complete search history.

(56) References Cited

U.S. PATENT DOCUMENTS

| | | | |
|---|---|---|---|
| D398,833 S | 9/1998 | Hammar | |
| 8,827,252 B2 | 9/2014 | Anderson | |
| 8,869,732 B1 | 10/2014 | Chervick | |
| 2021/0268640 A1 | 9/2021 | Clarke | |
| 2022/0089282 A1* | 3/2022 | Ciesielczyk | .............. F16B 2/18 |

FOREIGN PATENT DOCUMENTS

| | | | | |
|---|---|---|---|---|
| BR | PL01615734-3 A2 | 5/2011 | | |
| FR | 3100091 A1 | 8/2020 | | |
| WO | WO-2016089955 A2 * | 6/2016 | .......... | A61M 5/1415 |

OTHER PUBLICATIONS

Preformed Line Products, Raptor Clamp Diverters, Aug. 2020, pp.
1-2, Cleveland, Ohio.

* cited by examiner

*Primary Examiner* — Jason L Vaughan
*Assistant Examiner* — Amanda Kreiling
(74) *Attorney, Agent, or Firm* — Stanley J. Gradisar
Attorney At Law, LLC; Stanley J. Gradisar

(57)          ABSTRACT

A device for attaching multiple components to power lines
via drone. The invention includes a clamp which is attached
to a power line following activation of an included trigger.
Prior to activation on the power line the clamp is firmly
attached to a drone payload arm. The payload arm attaches
to the front of a drone and includes a track with a plurality
of clamp attach points. The track can be rotated by a
microcontroller and motor to allow installation of multiple
clamps and attached payloads onto power lines in a single
drone flight.

27 Claims, 8 Drawing Sheets

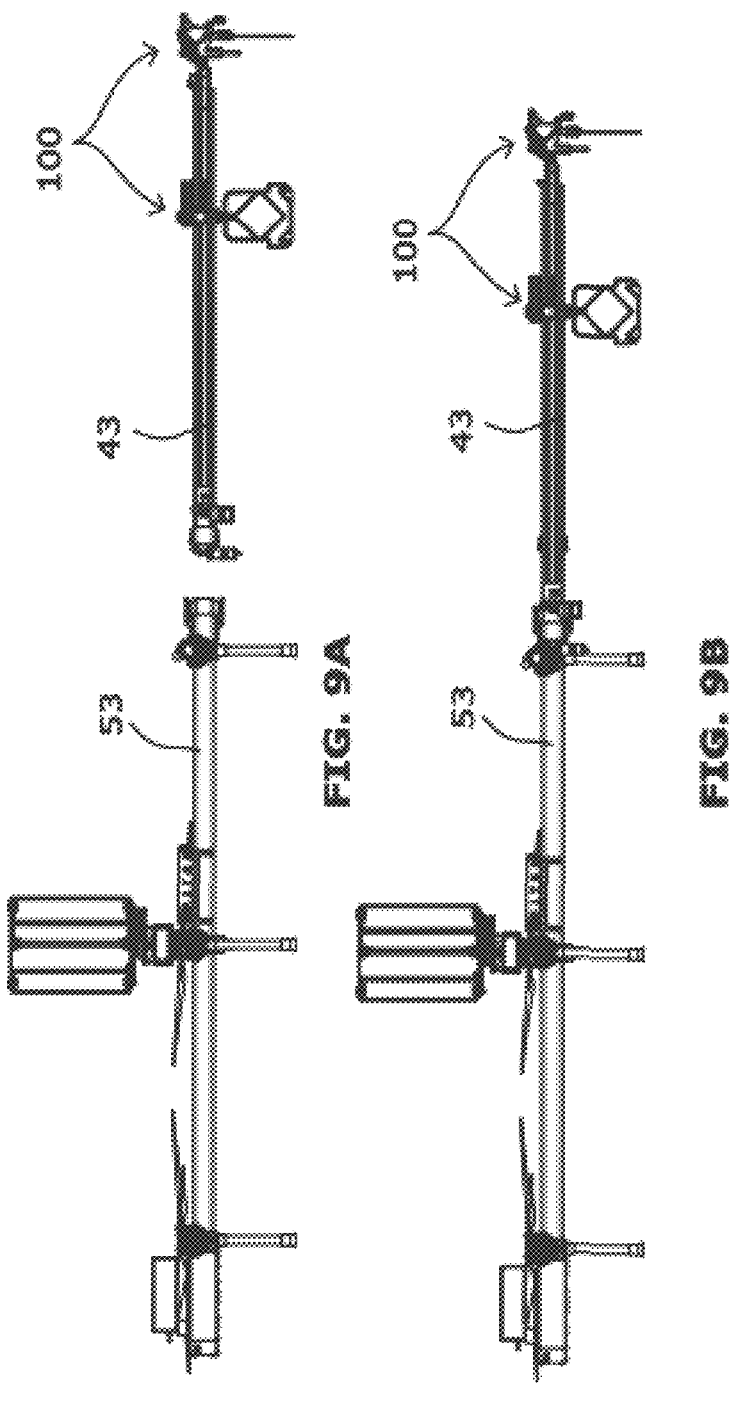

DRONE DEPLOYABLE CLAMP WITH MODULAR PAYLOAD

BACKGROUND OF THE INVENTION

As part of the power line industry, utilities must be able to attach items to power lines. Various items that are needed to be attached to power lines include marker balls to increase visibility for low flying aircraft, bird diverters to prevent bird-line collisions, vibration dampers to absorb wind vibrations, sensors to characterize power line health, spacers to maintain separation of conductors, and more. Linemen generally install these devices at great risk with helicopters and bucket trucks. Remote installation by unmanned aerial vehicles (UAVs), or drones, can greatly reduce the cost and risk of these operations. However, installing available devices and mechanisms require prohibitively complex processes (torquing bolts, installing pins, etc.) and/or excessive reaction force. This makes the drone installation of those devices difficult or impossible.

The present invention is a drone deployable clamp designed for simple and low-force drone installation. The drone deployable clamp shown in FIG. 1 is designed in a way that when it is in a set position it is firmly attached to a drone interface key, but when the drone deployable clamp is deployed it releases from the drone interface key and firmly attaches to a power line with no additional action required by the drone. This process is shown in FIGS. 3A-3E. The drone deployable clamp consists of a bottom clamp that houses a spring-loaded piston and a top clamp with two rotating levers, a front lever arm and a back lever arm, that are used for the mechanical advantage. The back lever arm locks with the bottom clamp to keep the set position. When a force is applied to the front lever arm, the force is transferred via a front lever arm force transfer member to the back lever arm which allows the back lever arm hook to release causing a piston that is spring-loaded by a compression spring to close the top and bottom clamps around the power line. The mechanical advantage of the levers provides a high clamping force around the power line while allowing a drone to provide minimum thrust to deploy the drone deployable clamp. The front of the bottom clamp has a payload connection that allows for a variety of payloads to be attached for varying purposes on power lines.

SUMMARY OF THE INVENTION

This invention is a novel drone deployable clamp which allows for a high clamping force and low deployment force so that a drone can attach different payloads to power lines. The drone deployable clamp is designed to securely lock to a corresponding interface key on a drone when in the set position. A drone pilot can then maneuver to power lines so that the power line enters the opening created by the top and bottom teeth of the drone deployable clamp. The drone touches the front lever arm of the drone deployable clamp to the power line and provides a small amount of force on the trigger. Through mechanical advantage, the small amount of force on the front lever arm will disengage the back lever arm so that the force from the spring-loaded piston closes the top clamp and the bottom clamp together around the power line. This releases the drone interface key from the back of the drone deployable clamp so that the drone pilot can safely back away from the power line. Multiple drone deployable clamps can be deployed from a chain of interface keys on a drone payload arm. These interface keys are moved about a horseshoe track by a belt and motor. The interface keys are rotatable to allow the clamps to be mounted at a series of angles relative to the payload arm.

BRIEF DESCRIPTION OF DRAWINGS

FIGS. 9A-9B show an embodiment of the installation of the payload arm onto a hybrid cyclorotor drone.

Figures 1, 2A, 2B, 2C:
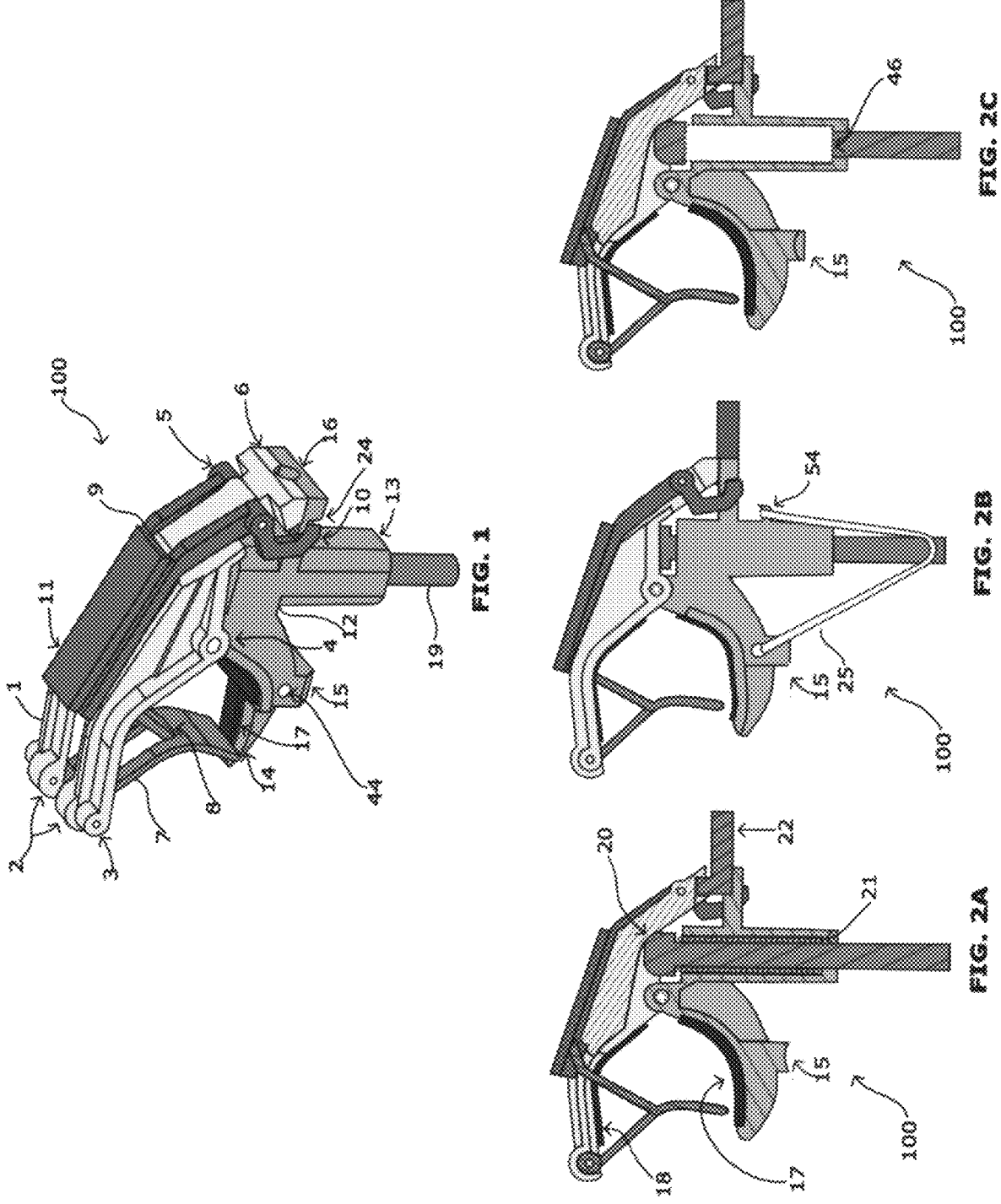
FIG. 1 shows an isometric view of an embodiment of the drone deployable clamp.
FIGS. 2A-2C show section views of an embodiment of the drone deployable clamp with the spring-loaded piston as well as different variations of the way the piston can be pre-loaded with force.

To assist in the understanding of the present disclosure the following list of components and associated numbering found in the drawings is provided herein.

| Component | # |
| --- | --- |
| top clamp | 1 |
| top clamp teeth | 2 |
| front lever arm pivot | 3 |
| main pivot point | 4 |
| back lever arm pivot | 5 |
| top clamp drone interface lock | 6 |
| front lever arm | 7 |
| front lever arm force transfer member | 8 |
| back lever arm | 9 |
| back lever arm hook | 10 |
| back lever arm force transfer lever | 11 |
| bottom clamp | 12 |
| bottom clamp piston housing | 13 |
| bottom clamp tooth | 14 |
| bottom clamp payload connection | 15 |
| bottom clamp drone interface lock | 16 |
| bottom clamp high-temperature rubber | 17 |
| top clamp high-temperature rubber | 18 |
| piston | 19 |
| piston head | 20 |
| compression spring | 21 |
| drone interface key | 22 |
| power line | 23 |
| bottom clamp lever arm hook | 24 |
| rubber band | 25 |
| smaller hanging modular component | 26 |
| larger platform modular component | 27 |
| swivel | 28 |
| bird diverter | 29 |

-continued

| Component | # |
| --- | --- |
| sensor | 30 |
| belt | 31 |
| stepper motor | 32 |
| sliders | 33 |
| linear track | 34 |
| curved track | 35 |
| frontmost slider | 36 |
| slider interface | 37 |
| slider base | 38 |
| slider spring | 39 |
| slider screw | 40 |
| slider interface gear | 41 |
| slider base ring gear | 42 |
| drone payload arm | 43 |
| payload attach pin | 44 |
| arbitrary payload | 45 |
| arbitrary piston release mechanism | 46 |
| slider with interface key aligned with a left angle to center | 47 |
| slider with interface key aligned with no angle to center | 48 |
| slider with interface key aligned with a right angle to center | 49 |
| slider with slider interface extended for rotation | 50 |
| slider with slider interface gear locked into slider base | 51 |
| slider base pin | 52 |
| hybrid cyclorotor drone | 53 |
| rubber band connection hook | 54 |
| drone deployable clamp | 100 |

DETAILED DESCRIPTION OF THE INVENTION

FIG. 1 shows an isometric view of an embodiment of the drone deployable clamp. Referring now to FIG. 1, there are five main components of the drone deployable clamp 100 that each have several smaller components attached to or part of them. These main components are the top clamp 1, the bottom clamp 12, the front lever arm 7, the back lever arm 9, and the piston 19. The front lever arm 7 and the back lever arm 9 are connected to the top clamp 1 at the front lever arm pivot 3 and the back lever arm pivot 5, respectively. The top clamp 1 is connected to the bottom clamp 12 at the main pivot point 4. All the pivots are held together with pins so that one of the members of the connection can rotate. The rotating members of the respective pivot connections include the front lever arm 7, the back lever arm 9, and the top clamp 1. The piston 19 is constrained inside the bottom clamp piston housing 13 so that the piston 19 can only move upwards and downwards. The bottom clamp payload connection 15 attaches to modular payloads via a payload attach pin 44.

The drone deployable clamp 100 needs to be able to adequately conform to the power line 23 and firmly hold its position on the power line 23 so that it does not move in the wind. This is achieved through the curvature seen in the top clamp teeth 2 and the curvature seen in the bottom clamp tooth 14. The inside of the top clamp teeth 2 and the bottom clamp tooth 14 are lined with top clamp high-temperature rubber 18 and bottom clamp high-temperature rubber 17 to grip and prevent rotation or translation on the power line 23. The bottom clamp high-temperature rubber 17 and top clamp high-temperature rubber 18 can be seen in FIGS. 2A-2C. The compression spring 21 is also loaded in a way so that it is always compressed and provides an upward force on the piston head 20 which will keep the drone deployable clamp 100 closed by pressing against the top clamp 1 which presses against bottom clamp 12.

FIGS. 2A-2C show section views of an embodiment of the drone deployable clamp with the spring-loaded piston as well as different variations of the way the piston can be pre-loaded with force. Referring now to the cross section shown in FIG. 2C, it is shown that the drone deployable clamp 100 can be used with a variety of internal forces besides a compression spring 21 which is shown in the cross section of FIG. 2A. For example, the piston 19 could be loaded with force caused by a rubber band 25 which would eliminate the metal clamp components for operation in high-electric fields (corona mitigation), actuated by an electric actuator to allow automatic disengagement from a power line 23, or other means. A rubber band 25 could be attached to a location on the front of the bottom clamp such as the clamp payload connection 15, through the piston 19, and hooks to the rubber band connection hook 54. This variation is shown in FIG. 2B. Any arbitrary piston release mechanism 46 is shown in FIG. 2C to account for the multitude of ways that the piston can be loaded and released. All these variations are considered and may be interchanged depending on the specific application requirements.

Figures 3A, 3B, 3C, 3D, 3E:
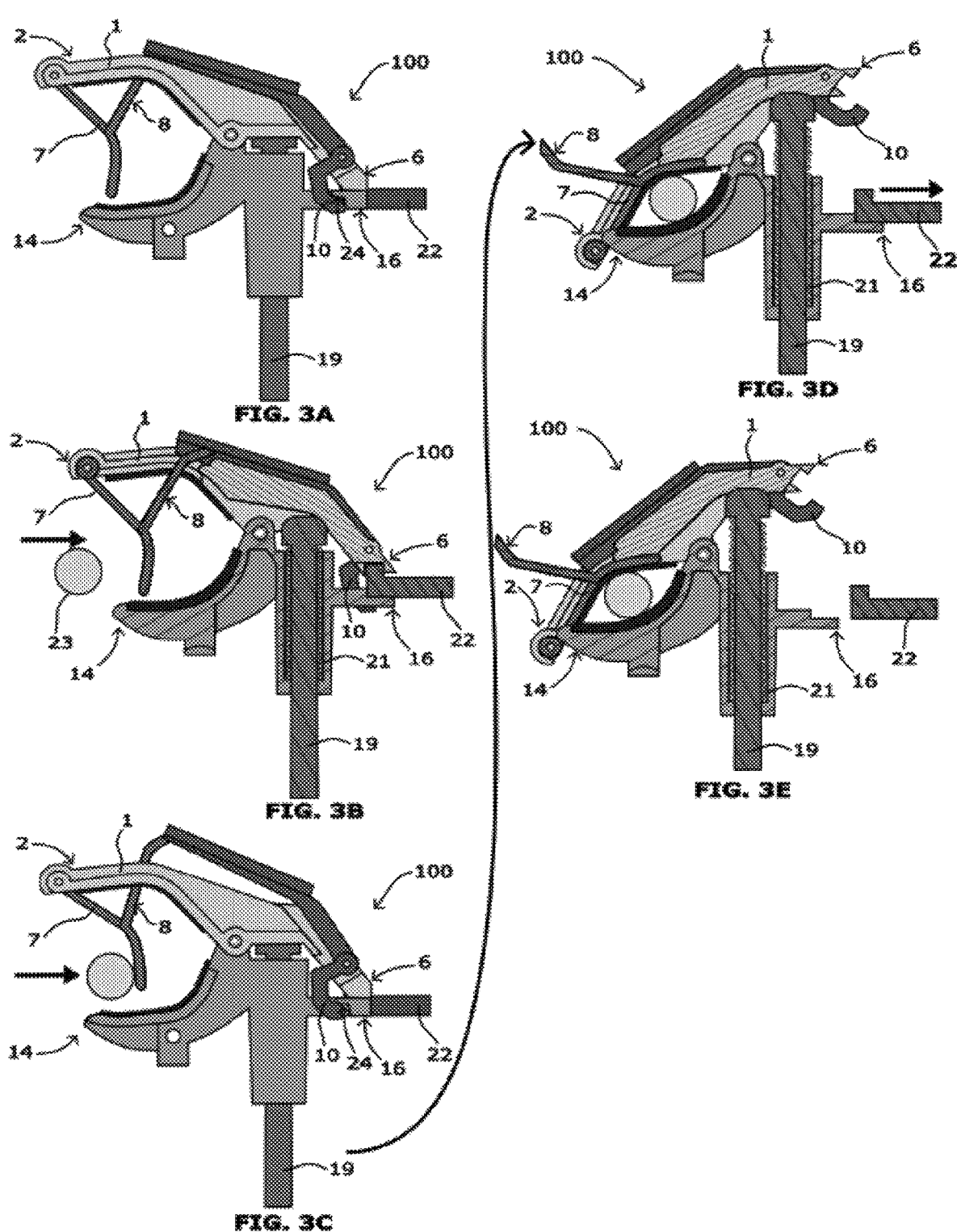
FIGS. 3A-3E show side and section views of an embodiment of the process of how a set drone deployable clamp is attached to a power line and how the drone interface key is released from the back of the drone deployable clamp.

FIGS. 3A-3E show side and section views of an embodiment of the process of how a set drone deployable clamp is attached to a power line 23 and how the drone interface key is released from the back of the drone deployable clamp. Referring now to FIGS. 3A-3E, the drone deployable clamp 100 will first be attached to the hybrid cyclorotor drone 53 by locking the drone deployable clamp 100 in the set position around the drone interface key 22 (FIG. 3A). This is done by pulling the piston 19 down to compress the compression spring 21 so that the top clamp 1 can rotate to lock the drone interface key 22 into the cavities of the top clamp drone interface lock 6 and the bottom clamp drone interface lock 16. The back lever arm hook 10 is attached around the bottom clamp lever arm hook 24 so that the top clamp teeth 2 and the bottom clamp tooth 14 are furthest apart in the set position. The drone pilot is then able to fly the hybrid cyclorotor drone 53 so that the power line 23 enters the opening between the top clamp teeth 2 and the bottom clamp tooth 14 (FIG. 3B). The pilot will press the front lever arm 7 against the power line 23 by providing forward thrust from the hybrid cyclorotor drone 53 (FIG. 3C). The front lever arm 7 is shaped such that small diameter power lines 23 cannot move behind the front lever arm 7 and become stuck. Force against the front lever arm 7 causes the front lever arm force transfer member 8 to push upward on the back lever arm force transfer lever 11. This will cause a rotation about the back lever arm pivot 5 so that the back lever arm hook 10 is released from the bottom clamp lever arm hook 24 (FIG. 3D). When the lever arms are released from the set position, the compression spring 21 forces the piston head 20 upward against the top clamp 1 which then closes around the power line 23. The front lever arm 7 is designed in a way so that it follows the curved shape of the teeth of the top clamp teeth 2. This allows for the front lever arm 7 to be an internal component once the clamp is closed so that it is not freely rotating in the wind. Once the clamp is closed around the power line 23, the back of the clamp will open so that the drone interface key 22 is no longer locked between the drone interface locks of the top clamp drone interface lock 6 and the bottom clamp drone interface lock 16 (FIG. 3E). Once the interface key is released, the drone pilot can safely back away from the power line 23.

Figure 10:
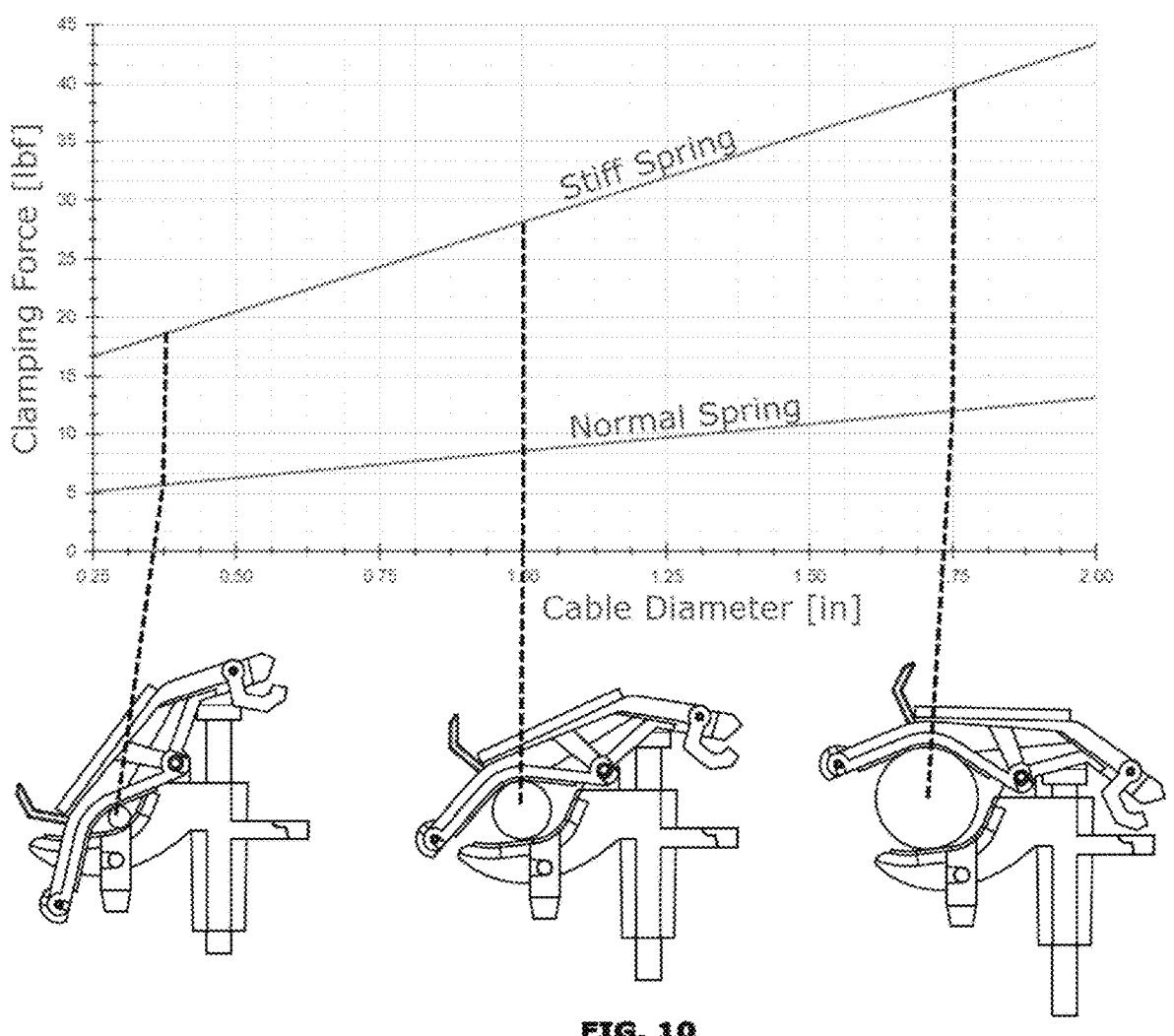
FIG. 10 shows a chart of the clamping force on a power line as a function of the power line diameter and a visual depiction of varying sized power lines inside an embodiment of the clamp.

FIG. 10 shows a chart of the clamping force on a power line as a function of the power line diameter and a visual depiction of varying sized power lines inside an embodiment of the clamp. Referring now to FIG. 10, a side view of the drone deployable clamp 100 on different power line 23 diameters is shown and plots the clamping force as a function of the power line 23 diameter for a normal compression spring 21 and a stiff compression spring 21. A key advantage of the deployable clamp 100 is that the front lever arm 7 and back lever arm force transfer lever 11 provide mechanical advantage to maximize the ratio of clamping force to deployment force. The ratio of the deployment force of the and clamping force is at least 1:10 for smaller cable diameters and approaches 1:15 for larger cable diameters. In one embodiment of the invention that utilizes a first normal compression spring 21, the deployment force, which is the force exerted on the front lever arm 7 when pushed against the power line 23, was measured to be about 0.5 lbs., whereas the clamping force varied from about 5 lbs. on a 0.25-inch diameter power line 23 to about 13 lbs. on a 1.75-inch diameter power line 23. In another embodiment of the invention that utilizes a second stiffer compression spring 21, the deployment force was measured to be about 1.5 lbs., whereas the clamping force varies from about 18 lbs. on a 0.25-inch diameter power line 23 to about 40 lbs. on a 1.75-inch diameter power line 23. One skilled in the art will recognize that many different compression springs with different levels of stiffness could be used depending upon the particular application. The two examples listed above are for illustrative purposes and the invention is not limited to only those two examples. The small deployment force facilitates installation with the drone deployable clamp 100 or a hotstick, while the higher clamping force prevents lateral or rotational motion of the drone deployable clamp 100 on the power line 23.

Figures 4A, 4B, 4C, 4D:
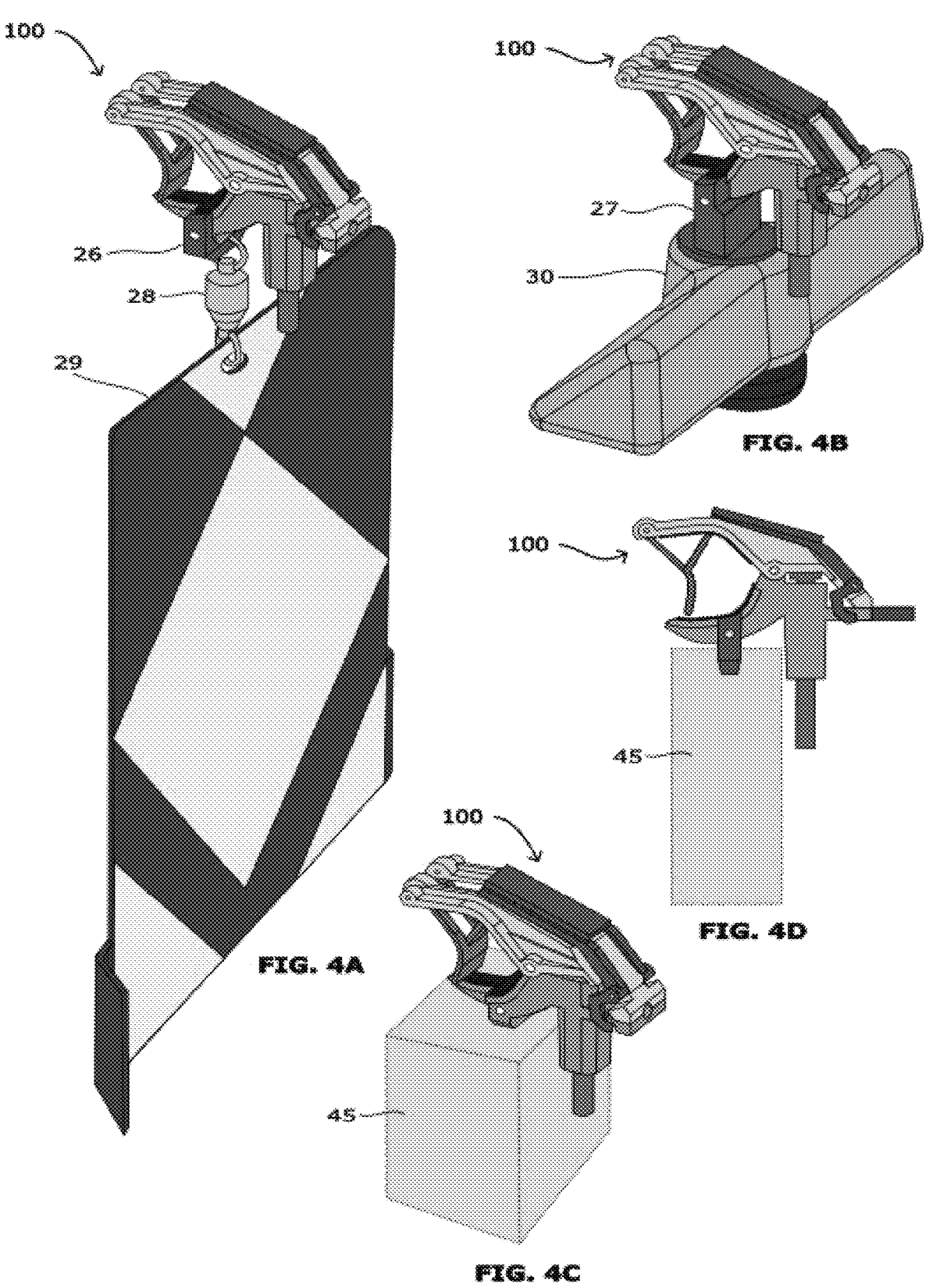
FIGS. 4A-4D show isometric and side views of an embodiment of the variations of the different types of payloads that can be attached to the front of the drone deployable clamp.

FIGS. 4A-4D show isometric and side views of an embodiment of the variations of the different types of payloads that can be attached to the front of the drone deployable clamp. Referring now to FIGS. 4A-4D, the drone deployable clamp 100 allows for many different payloads to be attached to the bottom clamp 12. This is done through any modular design that can be attached to the bottom clamp payload connection 15. An example smaller hanging modular component 26 (FIG. 4A) and the larger platform modular component 27 (FIG. 4B) are shown. The smaller hanging modular component 26 allows for the attachment of objects of little weight to hang freely from the bottom clamp payload connection 15. This type of connection can be seen with items such the bird diverter 29 and swivel 28 assembly. The larger platform modular component 27 would be utilized for heavier components that are meant to be static on the power line 23 such as a sensor 30. Types of sensors 30 may include, but are not limited to, dynamic line rating (DLR) sensors, ambient adjusted line rating (AAR) sensors, line vibration and angle sensors, weather stations, vegetation monitoring cameras, fire detection sensors, corona monitoring sensors, line temperature sensors, security cameras, signals intelligence sensors, radio relay equipment, bird strike indicators, downed line monitors, voltage phase monitoring sensors, current monitoring sensors, arc flash observation sensors, and ground clearance monitors. A variety of attachments can be connected to the bottom clamp payload connection 15 with an arbitrary payload 45 (FIGS. 4C-4D).

Figures 7A, 7B, 8A, 8B, 8C, 8D, 8E:
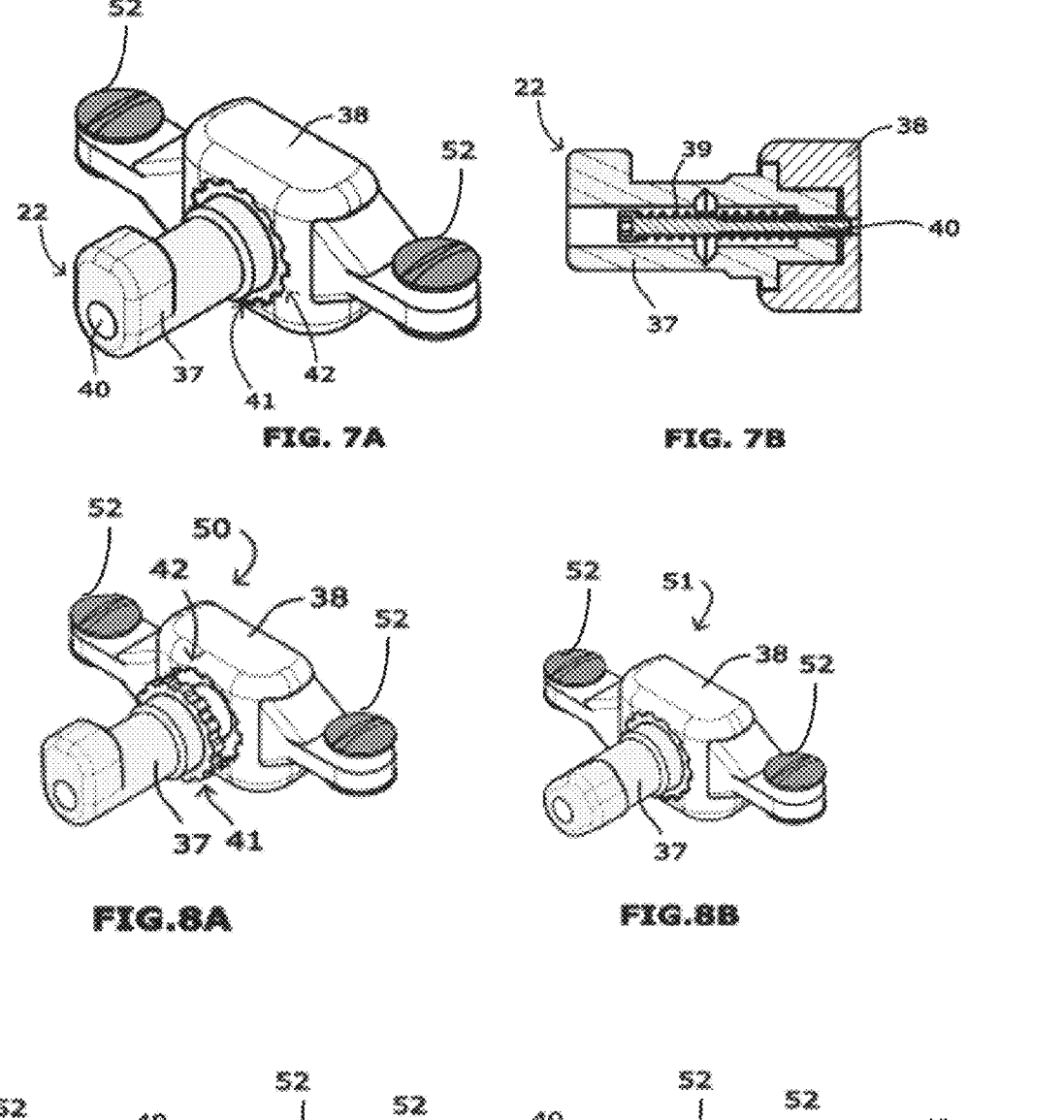
FIGS. 7A-7B show an embodiment of the slider components.
FIGS. 8A-8E show an embodiment of the reconfiguration of the slider components to install drone deployable clamps at different angles.

FIGS. 7A-7B show an embodiment of the slider components. Referring now to FIGS. 7A-7B, the sliders are comprised of two primary components, the slider interface 37 and the slider base 38. The front of the slider interface 37 constitutes the drone interface key 22. These two components are held together with the slider spring 39 and the slider screw 40. The slider interface 37 is designed with a gear base 41 and the slider base 38 has a complementary ring gear 42. The slider screw 40 is through the slider spring 39 and this assembly passes through a hole in the slider interface 37 and is screwed into the slider base 38. The slider spring 39 is a compression spring that is in an unloaded position when the slider interface gear 41 is locked into the slider base ring gear 42.

FIGS. 8A-8E show an embodiment of the reconfiguration of the slider components to install drone deployable clamps at different angles. Referring to FIGS. 8A-8E, the slider interface 37 can be pulled out of the slider base 38, compressing the slider spring 39, and rotated to a different set position. Once in a new set position, the slider interface 37 can be released so that the slider spring 39 can return to its natural position pulling the slider interface 37 back into the slider base 38. The slider with the slider interface extended for rotation 50 and the slider with the slider interface gear locked into the slider base 51 can be seen in FIGS. 8A and 8B. The slider interface key can be aligned with no angle to center 48 aligned with a left angle to center 47 or aligned with a right angle to center 49. These angles can be smaller or larger than the ones depicted in FIGS. 8C and 8E as rotation in either direction is not prohibited, which allows for full rotation in either direction. Such angle adjustments are made to match a power line 23 sag angle encountered in the field. Each slider base 38 is connected to the adjacent slider base 38 via a slider base pin 52.

Figure 5:
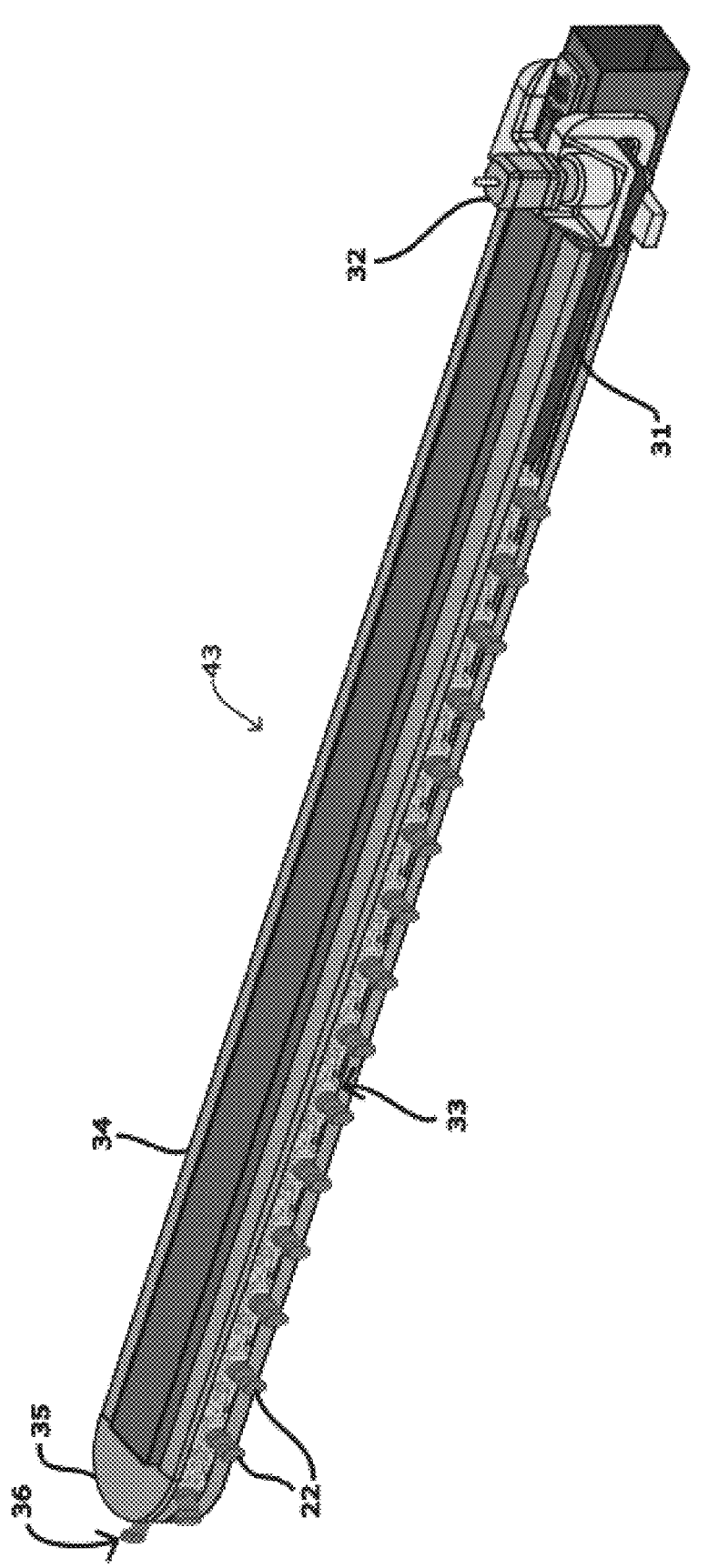
FIG. 5 shows an isometric view of an embodiment of the drone payload arm with the drone interface keys attached to sliders along a track.

FIG. 5 shows an isometric view of an embodiment of the drone payload arm with the drone interface keys attached to sliders along a track. Referring now to FIG. 5, a drone payload arm 43 is shown. This drone payload arm 43 is comprised of a series of sliders 33 that are connected in a chain with each one having a drone interface key 22 on the front. Both ends of the chain are connected with a belt 31. The belt 31 is controlled with a stepper motor 32 that the drone pilot controls. The chain follows a path set by the linear track 34 and the curved track 35. The chain consists of many sliders 33 so that multiple drone deployable clamps 100 and arbitrary payloads 45 can be deployed in a single flight.

FIGS. 9A-9B show an embodiment of the installation of the payload arm onto a hybrid cyclorotor drone. Referring to FIGS. 9A-9B, the drone payload arm 43 (shown unconnected in FIG. 9A) is designed to be placed on the front of a hybrid cyclorotor drone 53 disclosed in U.S. Pat. No. 11,614,754 Issued on Mar. 28, 2023 (shown connected in FIG. 9B). One skilled in the art will recognize that any other suitable drone besides hybrid cyclorotor drone 53 may be utilized. It can be quickly removed and replaced with another tool. The same drone payload arm 43 could also be deployed with a hotstick, a bucket truck, or a robot.

Figures 6A, 6B, 6C, 6D:
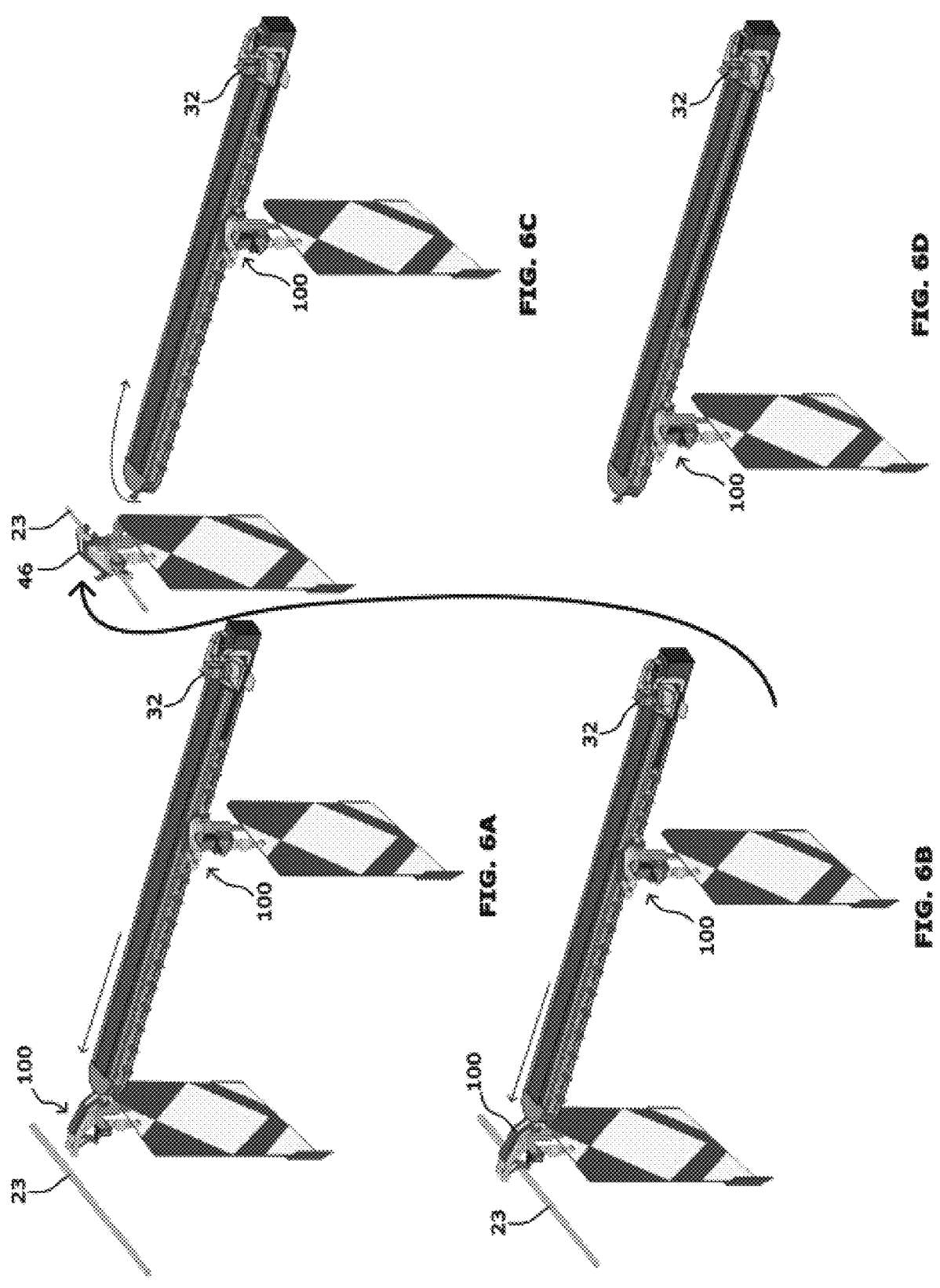
FIGS. 6A-6D show isometric views of an embodiment of the process through which the payload arm releases the drone deployable clamps and payloads.

FIGS. 6A-6D show isometric views of an embodiment of the process through which the payload arm releases the drone deployable clamps and payloads. Referring to FIGS. 6A-6D, before taking off, the drone pilot will load the drone payload arm 43 with as many drone deployable clamps 100 as desired (only two are shown for clarity) and that will fit on the particular drone payload arm 43 used. The drone pilot will approach the power line 23 as shown in FIG. 6A and release the drone deployable clamp 100 attached to the frontmost slider 36 through the process shown in FIGS. 3A-3E. While maneuvering the drone to the next location for deployment, the pilot will activate the stepper motor 32 so that the next slider 33 rotates to the frontmost position. This stepper motor 32 can be controlled by a microcontroller, the drone autopilot, or other suitable means. Activation of the microcontroller can be provided by the pilot or via sensor detection that the frontmost drone deployable clamp 100 has been deployed. The pilot will continue these steps until all the drone deployable clamps 100 are released from the drone.

What is claimed is:

1. A drone deployable clamp comprising:
a bottom clamp;
a top clamp pivotably connected to the bottom clamp;
a front lever arm pivotably connected to the top clamp at a distal end of the top clamp;
a back lever arm pivotably connected at a back lever arm pivot at a proximal end of the top clamp; and
a piston housed within a bottom clamp piston housing in the bottom clamp.

2. The drone deployable clamp according to claim 1 wherein the bottom clamp further comprises:
a curved upper surface;
a bottom clamp tooth at a distal end of the bottom clamp; and
a bottom clamp drone interface lock at a proximal end of the bottom clamp.

3. The drone deployable clamp according to claim 2 wherein the top clamp further comprises:
a curved lower surface;
a top clamp drone interface lock at a proximal end of the top clamp that engages with the bottom clamp drone interface lock; and
a pair of top clamp teeth at a distal end of the top clamp.

4. The drone deployable clamp according to claim 3 further comprising:
a bottom clamp high temperature rubber attached to the curved upper surface of the bottom clamp; and
a top clamp high temperature rubber attached to the lower curved surface of the top clamp.

5. The drone deployable clamp according to claim 3 further comprising:
a drone interface key that is received between the top clamp drone interface lock and the bottom clamp drone interface lock.

6. The drone deployable clamp according to claim 1 wherein the front lever arm further comprises:
a curved front surface; and
a front lever arm force transfer member that engages with a back lever arm force transfer lever at a distal end of the back lever arm.

7. The drone deployable clamp according to claim 6 wherein the back lever arm further comprises:
a back lever arm hook at a proximal end of the back lever arm that engages via the back lever arm pivot with the bottom clamp at a proximal end of the bottom clamp.

8. The drone deployable clamp according to claim 7 further comprising:
a bottom clamp lever arm hook that engages with the back lever arm hook.

9. The drone deployable clamp according to claim 1 further comprising:
a compression spring located around the piston and within the bottom clamp piston housing; and
a piston head that engages with a lower surface of the top clamp.

10. The drone deployable clamp according to claim 9 wherein the compression spring having a first level of stiffness exerts a clamping force between the top clamp and the bottom clamp on a power line ranging from about five lbs. to about thirteen lbs. depending on a diameter of the power line.

11. The drone deployable clamp according to claim 10 wherein a deployment force exerted on the front lever arm when pushed against the power line is about 0.5 lbs.

12. The drone deployable clamp according to claim 9 wherein the compression spring having a second level of stiffness exerts a clamping force between the top clamp and the bottom clamp on the power line ranging from about fifteen lbs. to about forty lbs. depending on the diameter of the power line.

13. The drone deployable clamp according to claim 12 wherein a deployment force exerted on the front lever arm when pushed against the power line is about 1.5 lbs.

14. The drone deployable clamp according to claim 1 wherein a first ratio between a first deployment force exerted upon the front lever arm to a first clamping force exerted on a smaller diameter of a power line is at least 1:10, and a second ratio between a second deployment force exerted upon the front lever arm to a second clamping force exerted on a larger diameter of the power line is at least 1:15.

15. The drone deployable clamp according to claim 1 further comprising:
a bottom clamp payload connection located on the bottom of the bottom clamp.

16. A method for attaching an arbitrary payload to a power line, the method comprising the steps of:
(a) attaching at least one drone deployable clamp to a drone;
(b) putting the at least one drone deployable clamp into a set position such that a top clamp and a bottom clamp of the at least one drone deployable clamp create an opening, wherein the top clamp and the bottom clamp are farthest apart from each other in the set position;
(c) attaching the arbitrary payload to the at least one drone deployable clamp;
(d) flying the drone forward to a first position of the power line so that the power line enters the opening between the top clamp and a bottom clamp; and
(e) flying the drone further forward pushing a front lever arm within the opening between the top clamp and the bottom clamp against the power line, triggering a compression spring within the at least one drone deployable clamp into releasing, causing the top clamp into rotating towards the bottom clamp, securing the power line between the top clamp and the bottom clamp, and causing the at least one drone deployable clamp with the arbitrary payload attached thereto into disengaging from the drone.

17. The method for attaching an arbitrary payload to a power line according to claim 16 wherein step (a) further comprises the steps of:
attaching the at least one drone deployable clamp to a drone payload arm; and
attaching the drone payload arm to the drone.

18. The method for attaching an arbitrary payload to a power line according to claim 17 wherein step (b) further comprises the step of:
locking the at least one drone deployable clamp around a drone interface key that is attached to the drone payload arm.

19. The method for attaching an arbitrary payload to a power line according to claim 18 further comprising the step of:
attaching the drone interface key to a slider base that is attached to a slider that is attached to a belt that is attached to the drone payload arm;
attaching the belt to a stepper motor;

activating the stepper motor for moving the slider along a
linear track along a length of the drone payload arm and
onto a curved track located at a distal end of the drone
payload arm and positioning the at least one drone
deployable clamp at the distal end of the drone payload
arm.

20. The method for attaching an arbitrary payload to a
power line according to claim 19 wherein step (d) further
comprises the step of:

(d1) flying the drone forward to a next position of the
power line and advancing a next at least one drone
deployable clamp to the distal end of the drone payload
arm by activating the stepper motor so that the power
line at the next position enters an opening between a top
clamp and a bottom clamp of the next at least one drone
deployable clamp.

21. The method for attaching an arbitrary payload to a
power line according to claim 20 wherein step (e) further
comprises the step of:

(e1) flying the drone further forward pressing a front lever
arm of the next at least one drone deployable clamp
within the opening between the top clamp and the
bottom clamp against the power line, triggering a
compression spring within the next at least one drone
deployable clamp into releasing, causing the top clamp
into rotating towards the bottom clamp, securing the
power line between the top clamp and the bottom
clamp, and causing the next at least one drone deploy-
able clamp with an arbitrary payload attached thereto
into disengaging from the drone.

22. The method for attaching an arbitrary payload to a
power line according to claim 21 further comprising the step
of:

repeating the steps (d1) and (e1) until a last at least one
drone deployable clamp is attached to the power line at
a last position of the power line.

23. The method for attaching an arbitrary payload to a
power line according to claim 18 further comprising the step
of:

adjusting an angle of the drone interface key with respect
to the slider base to match a cable sag angle of the
power line.

24. The method for attaching an arbitrary payload to a
power line according to claim 16 further comprising the step
of:

selecting the compression spring having a first stiffness
characteristic that exerts a clamping force between the
top clamp and the bottom clamp on the power line
ranging from about five lbs. to about thirteen lbs.
depending on the diameter of the power line; and step (e) further comprises pushing the front lever arm
against the power line thereby exerting a deployment
force of about 0.5 lbs. on the front lever arm.

25. The method for attaching an arbitrary payload to a
power line according to claim 16 further comprising the step
of:

selecting the compression spring having a second stiffness
characteristic that exerts a clamping force between the
top clamp and the bottom clamp on the power line
ranging from about fifteen lbs. to about forty lbs.
depending on the diameter of the power line; and step (e) further comprises pushing the front lever arm
against the power line thereby exerting a deployment
force of about 1.5 lbs. on the front lever arm.

26. The method for attaching an arbitrary payload to a
power line according to claim 16 further comprising the step
of:

selecting the compression spring with a level of stiffness
to produce a ratio between a deployment force exerted
upon the front lever arm to a clamping force between
the top clamp and the bottom clamp exerted on a
diameter of a power line that is at least 1:10.

27. The method for attaching an arbitrary payload to a
power line according to claim 16 further comprising the step
of:

selecting the compression spring with a level of stiffness
to produce a ratio between a deployment force exerted
upon the front lever arm to a clamping force between
the top clamp and the bottom clamp exerted on a
diameter of a power line that is at least 1:15.

* * * * *